June 15, 1954  J. W. J. ACKERMANS  2,681,245
FRICTIONAL FLOATING MECHANISM FOR DOOR
MOUNTING AND RETAINING AND THE LIKE
Filed April 15, 1950

INVENTOR.
John W. J. Ackermans
BY
A R McCrady
Attorney.

June 15, 1954  J. W. J. ACKERMANS  2,681,245
FRICTIONAL FLOATING MECHANISM FOR DOOR
MOUNTING AND RETAINING AND THE LIKE
Filed April 15, 1950   2 Sheets-Sheet 2
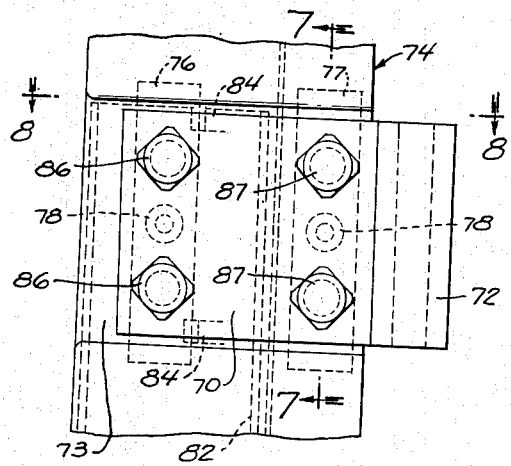
Fig. 6.
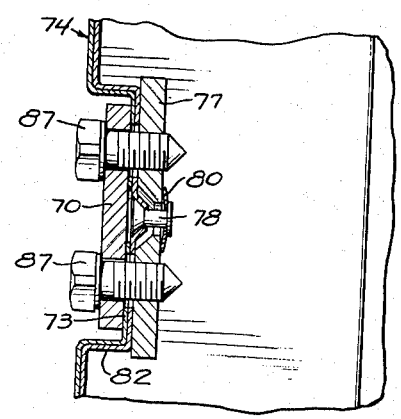
Fig. 7.
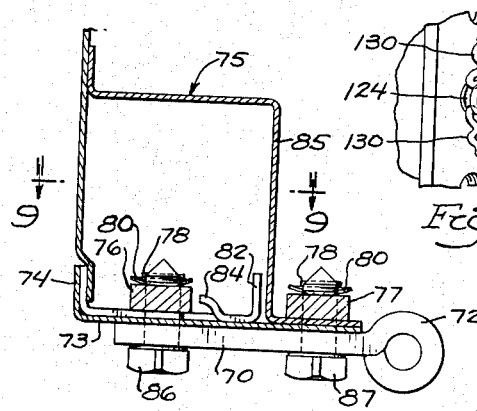
Fig. 8.
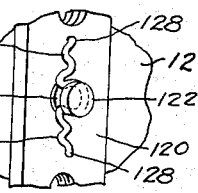
Fig. 14.
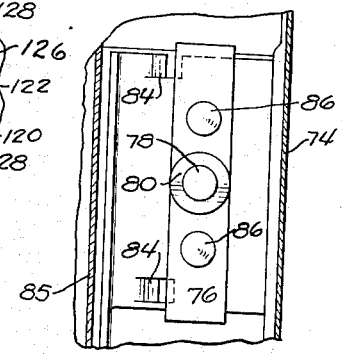
Fig. 9.
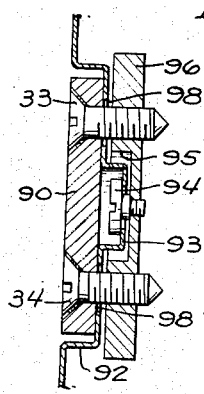
Fig. 10.
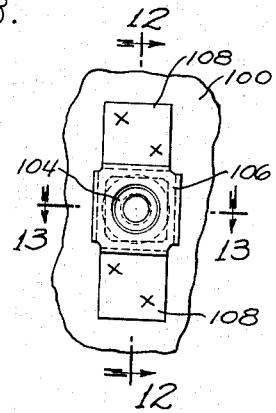
Fig. 11.
Fig. 12.
Fig. 13.
INVENTOR.
John W. J. Ackermans
BY
A R McCrady
Attorney.

Patented June 15, 1954

2,681,245

UNITED STATES PATENT OFFICE 2,681,245

FRICTIONAL FLOATING MECHANISM FOR DOOR MOUNTING AND RETAINING AND THE LIKE

John W. J. Ackermans, Detroit, Mich.

Application April 15, 1950, Serial No. 156,205

18 Claims. (Cl. 292—341.19)

This invention relates to floating friction plate or tapping plate mechanism for mounting and retaining doors and accessories or brackets and fittings and similar elements in automobiles and other structures where a certain amount of adjustability is required to allow for slight variations of sub-assemblies that make up final assemblies for mass production.

My floating plate or tapping plate requires in some instances only one plain, tubular or split rivet or other suitable fastener and one spring washer or tensioner to retain it in place. Its rotation is limited by one or more obstructions adjacent to, or on, the part that carries the floating plate and/or on the plate itself.

The invention has been designed particularly for use with automobile doors and body pillars and other body structure members, and one form of the invention is directed to mechanism for adjustably locating the striker plate which is mounted on a door opening structural member to cooperate with a latch member carried by the door itself for retaining the door in closed position.

Since the sheet metal of which automobile door opening structural members are formed is of relatively light gauge, it is necessary that it be reinforced at the place where the striker plate is secured thereto. This is sometimes done by securing to the inside of the jamb's face of said door opening a reinforcing part to which is attached a cage or retainer for carrying a floating tapping plate, designed to receive screws extending through the striker plate and the clearance holes in the metal of the door opening jamb or structure member and threaded into the floating tapping plate. In order to permit accurate alignment of the striker plate with the latch member it is necessary that the floating tapping plate be movable vertically or horizontally and inwardly or outwardly to thereby adjust the location of the striker plate, and be fixedly held in place when the screws are tightened. Because of the manner in which automobile bodies are constructed, the tapping plate or floating plate, at the time when the door is hung, is not accessible except through clearance holes for screws in the metal of the door jamb or through the inner body structure's access places.

The present invention aims to improve upon the known mechanism just indicated by providing a tapping plate or floating plate provided with fastening mechanism which is frictionally held in position against the inside surface of the door jamb by resilient means, so that when the floating plate is moved to a given position by a line-up pin or other tool inserted through one of the clearance holes for screws in the metal of the door jamb, it will remain in such position against the forces of gravity and vibration. The invention also contemplates a simplified mechanism in which the cage or retainer, which is often used to confine the floating plate, is eliminated.

Another object is to improve this type of device, when a single cage nut is used, by incorporating therein tension means to prevent objectionable rattling of the nut in the cage after installation and when a bolt is not to be inserted until after the automobile is sold.

A further object of the invention is to provide a mechanism which is more economical to manufacture than previous mechanisms of this type, and which may be more quickly and cheaply installed and replaced in case of breakage of co-acting parts.

Another object of my invention is to provide a floating plate having fastening mechanism and component parts that may be manufactured and installed without special dies or welding jigs, at the least possible cost by a simple clipping, clinching, burring, peening or screw method, or various other known suitable snap-on fasteners after the structure is painted to prevent paint clogging the screw threads.

Another object is to make the floating plate function as a reinforcement by extending its ends beyond the offset walls of a depression in the part that carries said plate. Twisting of the depressed area under strain of usage is thereby avoided without the use of a special reinforcement.

Another object is to use a temporarily floating plate held in place only by a screw, a pin and spring wire clip, or other known suitable and removable fastener and to cover up said fastener and its corresponding apertured recess in the jamb and/or lanced out stop prongs for said plate by subsequently attaching a fitting over them with other screws that enter into the floating tapping plate. The clearance holes for the screws that attach the fitting, the apertured recess in the jamb, and the lanced-out prong apertures may of course be punched in one and the same operation.

It should be understood that my tapping plate may be used to advantage in places where formerly a single cage nut or floating nut in a retainer was used. It may also be attached in places where welding-on a cage or retainer for a tapping plate is neither possible nor practical, as on certain painted or plated parts where welding would mar such finish, and for instance on fiber, plastic or wooden parts, etc.

Further objects of the invention will be understood from the following description, taken in connection with the appended drawings, in which:

Fig. 6 is a view in elevation of another form of the invention, as applied to the mounting of a hinge fitting.

Fig. 7 is a vertical section taken on line 7—7 of Fig. 6.

Fig. 8 is a horizontal sectional view taken on line 8—8 of Fig. 6.

Fig. 9 is a vertical sectional view taken on line 9—9 of Fig. 8.

Fig. 10 is a vertical section somewhat similar to Fig. 7 but showing a further modified form of the invention.

Fig. 11 is a view in elevation of a further modified form.

Fig. 12 is a vertical section taken on the line 12—12 of Fig. 11.

Fig. 13 is a horizontal section taken on the line 13—13 of Fig. 11.

Fig. 14 is a view in perspective of a modified form of tensioning mechanism.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
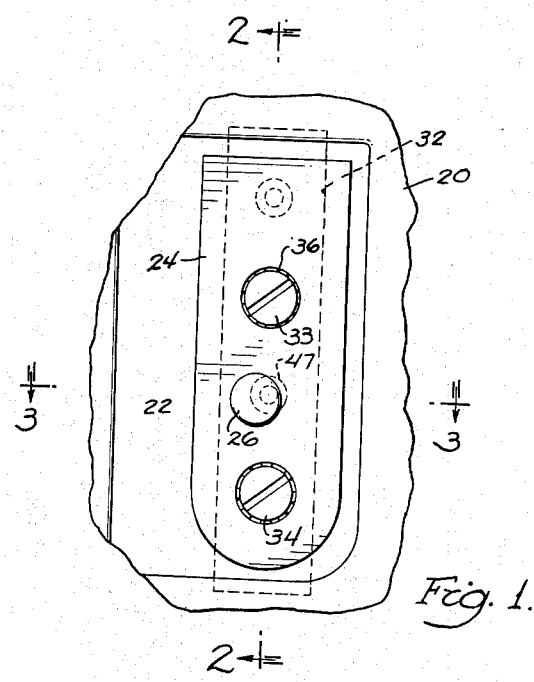
Fig. 1 is a view in elevation of a mechanism embodying one form of the invention.
Figure 2:
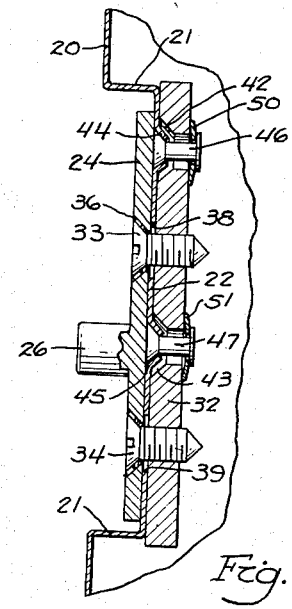
Fig. 2 is a vertical sectional view taken on the line 2—2 of Fig. 1.
Figure 3:
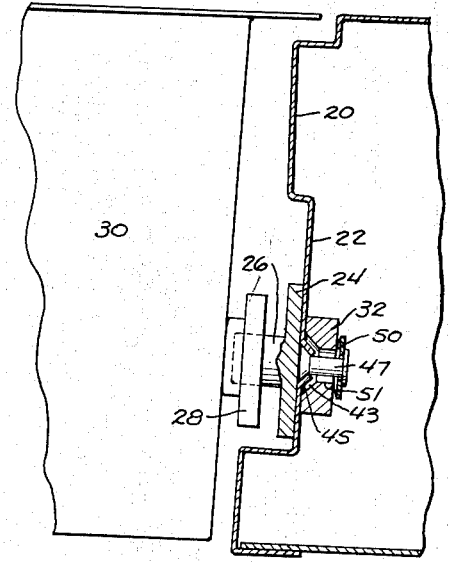
Fig. 3 is a horizontal sectional view taken on the line 3—3 of Fig. 1.

In the form of the invention shown in Figs. 1–3, the reference numeral 20 represents the jamb of an automobile door opening, the jamb being in the form of a pressed steel panel formed with a depression 22. On depression 22 is mounted a striker plate 24 which carries a keeper pin 26 cooperating with latch mechanism, indicated schematically in Fig. 3 at 28, of any suitable construction, and carried by the door 30.

Upon the inside surface of depression 22 is mounted a floating plate 32 which is drilled and tapped to receive screws 33, 34 countersunk in the striker plate and provided with suitable conical lock washers 36. In the assembled position shown, the screws 33, 34 hold the striker plate immovably in its proper position relative to the latch mechanism 28, and floating plate 32 extending beyond offset walls 21 acts to reinforce the depression 22, which without reinforcement is too light for the stresses to which it is subjected.

The floating plate 32, which may be attached to depression 22 at an earlier stage of fabrication of the body, is held in place by means of spring tensioners 50, 51 and peened rivets 46, 47. The floating plate, after its attachment, is not readily accessible from the jamb's outer surface for alignment except through clearance holes 38, 39 in depression 22. Holes 38, 39 are of greater dimensions (whether circular, oval, or rectangular) than are the shanks of screws 33, 34, so as to permit a limited amount of movement either horizontally or vertically and inwardly or outwardly, of the floating plate and striker plate fitting relative to the depression in the jamb.

The floating plate 32 may be of elongated rectangular shape as shown, with its major dimension vertical. It is provided with two countersunk apertures or recesses 42, 43 into which extend, with considerable clearance, smaller apertured recesses 44, 45 formed in depression 22. The floating plate is movably secured to depression 22 by rivets 46, 47 having their heads countersunk in said recesses and their ends peened over spring washers or tensioners 50, 51. The spring washers or tensioners are of a known type having curvature about an axis extending transversely of but spaced from the plane of the washer or tensioner, so that the washer forms a portion of a cylindrical surface. Instead of rivets 46, 47 a grooved pin may be used and instead of spring washers 50, 51 a spring wire clip tensioner may be used that also retains the pin, as shown in Fig. 14.

In the fabrication of the mechanism just described, the floating plate is assembled to the depression 22 while both surfaces of the depression are accessible, and is secured thereto by the rivets 46, 47. The position of the rivets relative to the apertures 42, 43 is at this stage random, but the spring washers or tensioners 50, 51 hold the floating plate into frictional contact with the inner surface of depression 22, so that the floating plate will remain in whatever position it is attached unless moved into another position by a strong force such as that exerted by a line-up pin or other tool.

When the striker plate is to be mounted, the operator inserts a line-up pin through one of the apertures 38, 39 and moves the tapping plate to its approximately correct position. He then puts the striker plate in place and inserts screws 33, 34, with their lock washers 36, tightening the screws enough to cause the assembly to remain in place. He may then test the alignment by closing and latching the door, and if further adjustment of keeper pin 26 relative to the latch mechanism is required, he may drive the keeper pin to the desired position against the frictional force tending to resist such movement. Finally the screws 33 and 34 are driven home, completing the assembly operation.

Figures 4, 5:
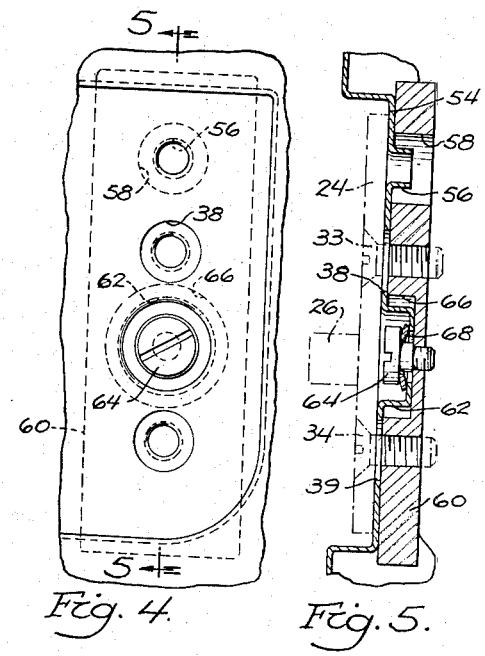
Fig. 4 is a view similar to Fig. 1 but showing a modified form of the invention.
Fig. 5 is a vertical section taken on line 5—5 of Fig. 4.

In the form of the invention shown in Figs. 4 and 5, the construction and operation are the same except as hereinafter noted. The depression indicated at 54 is in this case formed with a cylindrical flange 56 which extends, with clearance, into a cylindrical bore 58 in the floating tapping plate 60, the purpose of this arrangement being to permit the floating plate limited rotation and inward or outward movement while also permitting horizontal and vertical movement thereof. The depression 54 is also formed with a recess 62 which receives the head of a machine screw 64, the shank of the screw extending through an enlarged aperture in the base of the recess and threadedly engaging a threaded bore in the base of a recess 66 in the floating plate, larger than the recess 62 so as to permit circular movement of the floating plate relative to the depression 54. The screw 64 is provided with a spring washer 68 to hold the tapping plate into frictional contact with the inner face of the depression, as described in connection with Figs. 1-3. The striker plate and its associated elements, shown in broken lines in Fig. 5, may be similar to the corresponding elements of Figs. 1-3, although the screws 33, 34 are here shown formed with blunt rather than conical points.

Figs. 6-9 show the invention applied to the mounting of a hinge fitting of the door of an automobile or the like, a structure which presents problems similar to those met with in the mounting of a striker plate. In these figures, the hinge fitting 70, having the usual loop 72 to receive the hinge pintle, not shown, is to be secured in accurately predetermined relation to the depression 73 which forms part of the pillar 74. Two floating plates 76, 77 are used, each being held frictionally in place by a countersunk rivet 78 provided with a spring washer or tensioner 80, the arrangement being generally similar to that shown in Figs. 1-3. The pillar 74 comprises a sheet metal reinforcement 82 which, in the carrying out of this invention, may be lanced and deformed in the same operation as the clearance holes for the screws to form flanges 84, terminating adjacent the floating plate 76 and serving to limit rotation thereof. Rotation of the tapping plate 77 is limited by virtue of the fact that it lies adjacent the face 85 of front part 75 of the pillar 74. The hinge fitting 70, after being properly located, is fixedly held in position by screws 86, 87, respectively engaging the floating plates 76, 77. The operation of this embodiment will be understood from the explanation above given as to the other modifications of the invention.

In the modification shown in Fig. 10, the plate 90 may be a striker plate, a hinge fitting, or any similar element which is to be fixed in predetermined relation to depression 92 in the supporting pillar. In this construction, the pillar depression 92 is formed with a recessed portion 93 which receives the head of a machine screw 94 the shank of which extends through an aperture in portion 93 and threadedly engages a threaded bore in the base of a recess 95 in the floating plate 96. In this figure, the parts are shown in the positions which they occupy before the fastening screws 33, 34 have been drawn tight; at this stage, the floating plate 96 may be freely moved horizontally or vertically and inwardly or outwardly within the limits permitted by clearance holes 98 in the depression 92.

In the construction shown in Figs. 11-13, the supporting member 100 is provided with an aperture 102 designed to receive a bolt, not shown. A perforated part having screw threads, or a nut 104 is mounted opposite aperture 102 by means of a metal stamping of known construction comprising a rectangular cage 106, of greater lateral dimensions than the nut so as to permit adjusting movement of the nut relative to the aperture 102, but limiting rotation thereof. Above and below the cage the stamping is formed with flanges 108 which are welded to the supporting member 100. The sides of the cage are inturned as indicated at 110 to retain the nut in the cage prior to its assembly with member 100, and a spring washer 112, similar to spring washers 50, 51 of Figs. 1-3, is interposed between the nut 104 and the top of the cage, to frictionally retain the nut in position and prevent rattling thereof. This construction is particularly useful where nuts are provided for the optional installation of an automobile accessory or the like by the owner after his purchase of the vehicle; if the accessory is not installed, or if the installation does not require use of a given nut, it will remain in place without rattling.

In the form of the invention shown in Fig. 14, the floating friction plate indicated at 120 may be of the construction shown either in Figs. 1-3 or in Figs. 4-5 or 6-9. The pin 122, which corresponds to rivets 46, 47, screw 84, or rivet 78 in the other figures, is formed adjacent its outer end with a circular groove 124. In order to hold the plate 120 into yielding frictional contact with the sheet metal 126, a spring wire clip 128 of special construction is mounted in the groove 124 and engages the plate 120. Clip 128 has a middle portion which is bent in a plane parallel to that of plate 120 in such a way as to embrace well over 180° of groove 124, so that it may be snapped into place therein.

The end portions of the clip which extend in opposite directions outwardly from the center of pin 122 are bent in a plane normal to the surface of plate 120, first toward and into contact with the plate, then away from the plate, and finally toward the plate, terminating in proximity to the plate. Thus when the clip is positioned as indicated in Fig. 14 the clip contacts the plate 120 at points indicated at 130, forming a relatively rigid arch; but if the clip is reversed it will contact plate 120 at two points nearer the ends of the clip, forming a more flexible arch. The clip has two functions; to retain the pin, and to exert pressure on the plate 120. If the clip is not accurately formed, the ends rather than the portions 130 may contact the plate.

After the attaching screws that secure the fitting are in place, having drawn the tapping plate securely against the sheet metal 126 the wire clip 128 exerts sufficient longitudinal tension on the pin 122 to prevent said pin from rattling. Said longitudinal tension is also evident on rivets 46, 47 by spring washers 50, 51 in Figs. 1-3 and on rivet 78 and spring washer 80 in Figs. 6-9.

Although the invention has been described with particular reference to certain illustrated embodiments thereof, it may be embodied in other forms within the spirit of the invention, and is not limited except by the terms of the following claims.

I claim:

1. In a construction including a sheet-like supporting member intended to receive at one of its sides an attachment and to support the same thereat, a reinforcing tapping plate arranged at the other side of said supporting member, and at least one connector in the plane of said member and passing therethrough to hold said member and the plate together, said member being provided with an aperture for passage of said connector, said aperture being of larger size than the transverse dimension of said connector to provide substantial clearance space therebetween and allowing movement of said plate with respect to said supporting member, said plate being adapted to have the attachment secured thereto by means different than said connector and clearing said supporting member when said plate is moved.

2. The invention defined in claim 1, said connector being adapted to hold the supporting member and the plate together to produce yielding frictional resistance to the movement of the plate.

3. In a construction including a sheet-like supporting member intended to receive at one of its sides an attachment and to support the same thereat, a floating plate arranged at the other side of said supporting member, and at least one connector in the plane of said member and passing therethrough to hold said member and plate together, said member being provided with an aperture for passage of said connector, said aperture being of larger size than the transverse dimension of said connector to provide substantial clearance space therebetween to allow movement of said plate with respect to said supporting member, and at least one aperture in said supporting member for the passage of means connecting the attachment to the plate, said last aperture being of larger size than the cross section of said last means to provide substantial clearance therebetween.

4. In a construction including a supporting member intended to receive at one of its sides an attachment and to support the same thereat, a reinforcing floating plate arranged at the other side of said supporting member to be in frictional contact therewith, means connecting said plate to said supporting member and providing for limited relative movements of said plate with respect to said supporting member in the plane thereof, an attachment received at the side of said supporting member, and securing said attachment to said plate and gripping said supporting member between said attachment and said plate.

5. In a construction including a supporting member intended to receive at one of its sides an attachment and to support the same thereat, a plate arranged at the other side of said supporting member, means connecting said plate to said supporting member, and providing for limited relative movement of said plate with respect to said supporting member in the plane thereof, an attachment adapted to be received at the side of said supporting member, and threaded connecting means passing with clearance through said supporting member and adapted, when tightened, to secure the attachment and the plate together and to grip the supporting member therebetween for holding the attachment in its adjusted position.

6. In a construction including a relatively thin supporting member intended to receive at one of its sides an attachment and to support the same thereat in an adjustable position, a plate arranged at the other side of said supporting member, means connecting said plate to said supporting member to have the plate in sliding frictional contact therewith and providing for limited relative movement of said plate on said supporting member, and screw means passing with clearance through said supporting member and adapted when drawn tightly to grip the supporting member between said attachment and said plate and thus to hold said attachment in position at said supporting member and providing for adjusting said position.

7. In an automobile body construction, a relatively thin wall intended to receive at one of its sides a fitting, a reinforcing plate provided on the other side of said wall, and connecting means holding said plate against said wall and providing for limited rattleproof movement of said plate parallel to said supporting member, said supporting member being apertured for passage with clearance of means securing the fitting to said plate.

8. In an automobile body construction, a relatively thin wall intended to receive at one of its sides a fitting, a reinforcing plate provided on the other side of said wall, and connecting means passing through said wall and holding said plate against said wall and providing for limited movement of said plate parallel to said wall, said wall being provided with at least one opening for fastening means loosely passing therethrough and adapted to secure the fitting and the plate together and to fix them in an adjustable position on said wall.

9. In an automobile body construction, a sheet-like wall intended to receive at one of its sides a fitting, a reinforcing plate provided on the other side of said wall, connecting means holding said plate at said wall in yielding frictional engagement and providing for moving said plate in the plane of said wall within predetermined area limits, an aperture in said wall, a fitting provided at said one side of the wall, and screw means having cross section smaller than said aperture and passing therethrough with clearance, said screw means engaging said plate and adapted when tightened to draw said fitting and said plate toward each other and to grip the wall therebetween fixing said fitting in an adjustable position on said wall.

10. In an automobile body construction, a door-opening post having a relatively thin wall intended to receive at its outer side a striker fitting, a reinforcing plate provided on the inner side of said wall, connecting means passing through said wall and holding said plate to said wall in yielding frictional engagement and providing for moving said plate in the plane of said wall within predetermined area limits, two apertures in said wall, a striker fitting provided at the outer side of said wall, two screws of smaller diameter than said clearance apertures, said screws passing through said aperture with clearance and connecting said striker fitting to said reinforcing plate, said screws being adapted when tightened to draw said striker fitting and said reinforcing plate toward each other and to grip the wall between them thereby fixing said striker fitting in an adjustable position on said wall.

11. In an automobile body construction, a wall-like supporting member intended to receive at one of its sides a fitting, a reinforcing plate provided on the other side of said wall-like member, connecting means holding said reinforcing plate to said supporting member, said means being fixed from moving in the plane of said member but passing with clearance through said aperture in the plate to provide for limited movements of said plate relative to said member in a plane parallel to said member, and means preventing rotation of said reinforcing plate around said connecting means.

12. In an automobile body construction, a wall-like supporting member intended to receive at one of its sides a fitting, a reinforcing plate provided on the other side of said supporting member, at least two connectors fixed from moving in the plane of said wall-like member and passing with clearance through said reinforcing plate to hold the same in frictional engagement with said wall-like member and to provide for adjustable movements of said plate parallel to said wall-like member within predetermined area limits determined by the clearance between the connectors and the plate, a fitting provided on said wall-like member on the side opposite to the reinforcing plate side, at least two screws having heads engaging said fitting and shanks passing with clearance through said wall-like member and engaging said reinforcing plate, said screws being adapted when tightened to draw the fitting and the reinforcing plate together and to grip the wall-like member between them and thus to locate the fitting and the plate in an adjustable position thereat; the clearance between the screws and the wall-like member providing for adjustment movements of the connected fitting and the plate, while the clearance between the connectors fixed to the wall-like member and the plate provides for said movements of the plate.

13. In an automobile body construction, a wall-like supporting member adapted to receive a fitting at one of its sides, a reinforcing plate provided on the other side of said wall-like member and movable parallel thereto, connecting means for holding the reinforcing plate in frictional and floating contact with said wall-like member prior to attaching said fitting, means associated with the supporting member for limiting the movements of the reinforcing plate, said supporting member being provided with a clearance opening, a fitting provided at the supporting member on the other side from said reinforcing plate, fastening means of a smaller cross sectional dimension than said opening, said fastening means passing through said clearance opening and connecting said fitting and said reinforcing plate and fixing them in a predetermined position on said wall-like member, with said fitting and plate being movable for adjustments simultaneously.

14. In a device of the character described, a wall-like supporting member having an indented recess with an aperture and forming a protuberance extending from one side of said member, a reinforcing plate having a face in contact with said one side, said plate being provided with a larger recess into which said protuberance is inserted, said larger recess also having an aperture, a mechanical fastener passing through both of said apertures and frictionally and movably securing the plate and member together, to provide for adjustably moving said plate within a predetermined area limits to provide adjustments of the plate in any direction relative to the member within the plane of the plate, a fitting contacting the other side of said wall-like member, a clearance opening being provided in said member, a detachable fastener of smaller diameter than said clearance opening passing through the opening and securing the fitting to said member and reinforcing plate.

15. In a device of the character described, a wall-like supporting member, a reinforcing plate having a face contiguous with one side of the supporting member, a fitting having a surface contiguous with the other side of the supporting member, said supporting member being provided with at least one clearance opening, at least one detachable fastener of smaller diameter than said opening, said fastener passing through said opening and securing the reinforcing plate and fitting together, said face of said reinforcing plate being provided with a recess having an aperture, a protuberance in said supporting member, said protuberance alignable with the recessed aperture in the reinforcing plate and provided with an aperture, said recess confining said protuberance of said supporting member, fastening means extending through said aligned apertures and frictionally holding the reinforcing plate tightly against the supporting member to secure said reinforcing plate so that the reinforcing plate and fitting may be moved together relative to the supporting member.

16. A retainer adapted to be fastened to a wall-like member, said retainer having at least one clearance aperture, a floating part provided with at least one threaded hole, a spring action tensioner provided with a passage, said floating part and said tensioner being confined in said retainer and forming an assembled unit preventing said floating part and tensioner from rattling inside said retainer, said clearance aperture and said threaded hole and said passage being alignable to permit a screw to pass therethrough.

17. In an automobile body construction, a retainer fastened to a wall-like member, said retainer having at least one clearance aperture, a floating part provided with at least one threaded hole, a resilient tensioner provided with a passage, said floating part and said tensioner being rattle-proofly encaged by said retainer and the wall-like member; said clearance aperture, said threaded hole, and said passage being alignable for inserting a screw therethrough.

18. In a manufactured construction including a relatively thin wall-like member, a retainer fastened to said wall-like member, said retainer having at least one clearance aperture, a floating part provided with at least one threaded hole, a resilient tensioner provided with a passage, said floating part and said tensioner being rattle-proofly encaged by said retainer and the wall-like member; said clearance aperture, said threaded hole, and said passage being alignable for inserting a screw therethrough.

References Cited in the file of this patent

UNITED STATES PATENTS

| Number | Name | Date |
| --- | --- | --- |
| 1,272,115 | Russell | July 9, 1918 |
| 1,295,458 | Erffmeyer | Feb. 25, 1919 |
| 1,323,755 | Gogay | Dec. 2, 1919 |
| 1,323,757 | Gogay | Dec. 2, 1919 |
| 1,323,758 | Gogay | Dec. 2, 1919 |
| 1,497,841 | Disbro | June 17, 1924 |
| 1,860,438 | Thies | May 31, 1932 |
| 2,094,119 | Flora | Sept. 28, 1937 |
| 2,156,874 | Schonitzer | May 2, 1939 |
| 2,187,530 | Butler | Jan. 16, 1940 |
| 2,187,531 | Butler | Jan. 16, 1940 |
| 2,284,320 | Howe | May 26, 1942 |
| 2,305,122 | Wiley | Dec. 15, 1942 |
| 2,318,182 | Place | May 4, 1943 |